Sept. 19, 1933.        L. BREGUET              1,927,358
                  BRAKE CONTROL FOR AEROPLANES
                  Filed Jan. 15, 1931        2 Sheets-Sheet 2

Patented Sept. 19, 1933

1,927,358

UNITED STATES PATENT OFFICE 1,927,358

BRAKE CONTROL FOR AEROPLANES

Louis Breguet, Paris, France, assignor to Societe Anonyme Des Ateliers D'Aviation Louis Breguet, Paris, France, a company of France Application January 15, 1931, Serial No. 508,983, and in Germany January 17, 1930

6 Claims. (Cl. 188—72)

The invention relates to a brake control for aeroplane wheels.

Aeroplane wheel brakes generally in use hitherto have several disadvantages:

1. The movable control parts are exposed to the air and are subjected to harmful atmospheric influences in the case of certain brake parts such as motion links and return springs, which, in consequence of insufficient protection from dust, dirt or moisture are liable to stick or jam. This practice may cause aeroplanes to turn over as a result of landing with inoperative brakes.

2. The braking torque or moment applied to wheels by means of brakes similar to those of automobiles cannot produce the amount of braking required by the operator because the pressure of the brake parts on the brake drum does not depend only on the power exerted by the operator on the brake linkage. This power is transmitted with more or less intensity according to the position of the cam effecting the spreading of the brake shoes, the position of the latter depending on the adjustment of the brakes and on their wear.

This invention relates more particularly to brake control for aeroplane wheels preferably manufactured from plates of sheet material or cast plates, and of the type in which a section of the wheel by a plane passing through the wheel axle has the shape of a lozenge the sides of which are prolonged outwardly.

In aeroplane wheels of this type, the internal brake consists preferably of two brake shoes connected with the brake axle by leaf springs, the brake shoes being displaced in the direction of the wheel axle and being brought into contact with friction surface members fixed on the wheel.

The displacement of the brake shoes or rings is effected through a linkwork engaging therewith.

According to the invention, the said linkwork is operated by means of a head adapted to move within the wheel axle without rotation therein and adjustably connected with a socket member and the displacement of the latter is effected by the action of another piston actuated directly by means of fluid pressure or by a brake control.

A braking device constructed in this manner obviates the drawbacks mentioned above, for it permits an accurate control of the position of the movable head and consequently of the braking device when the brake is not in use and the moving parts of the brake device are completely enclosed in a housing.

Figure 1:
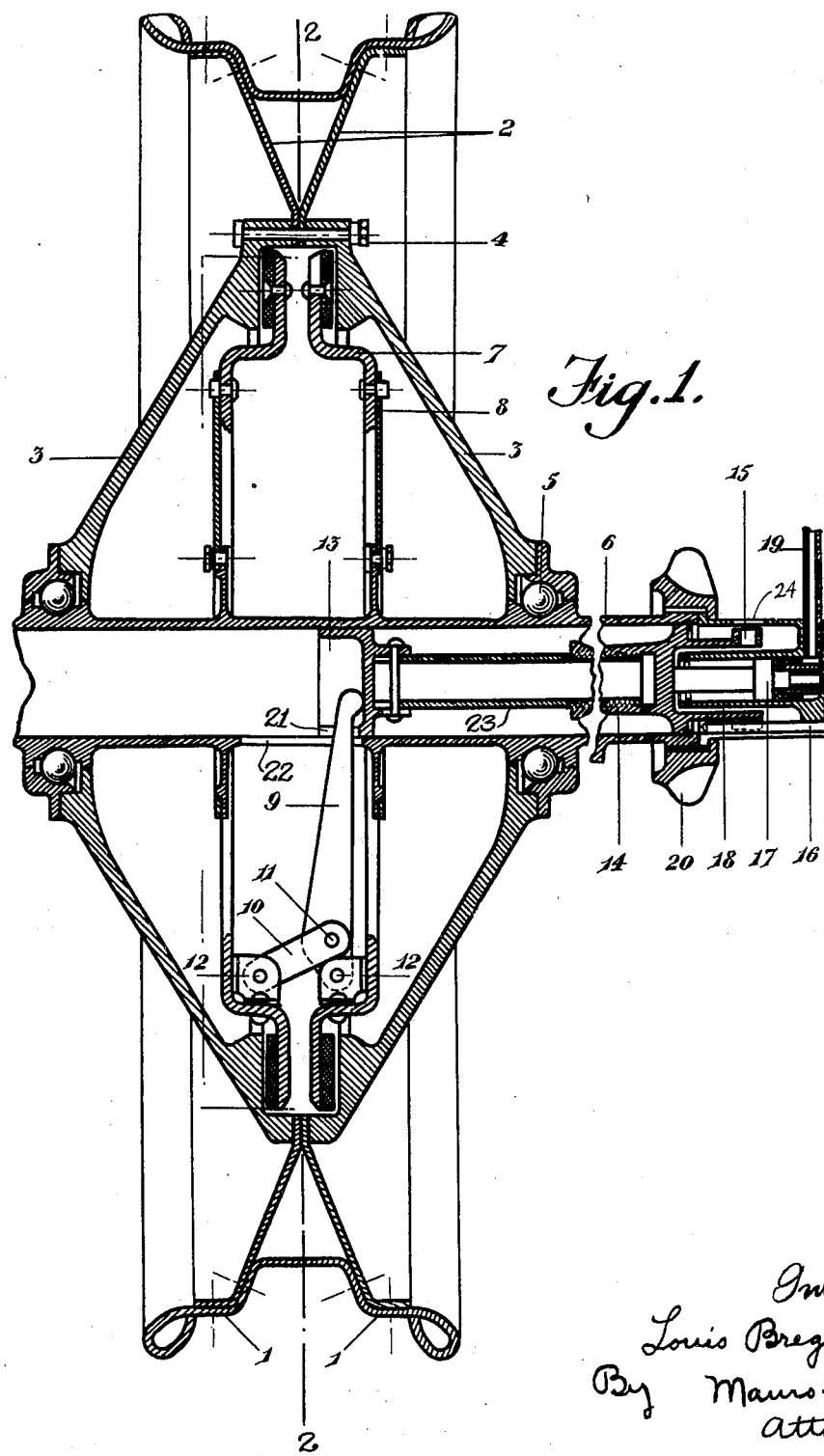
Figure 2:
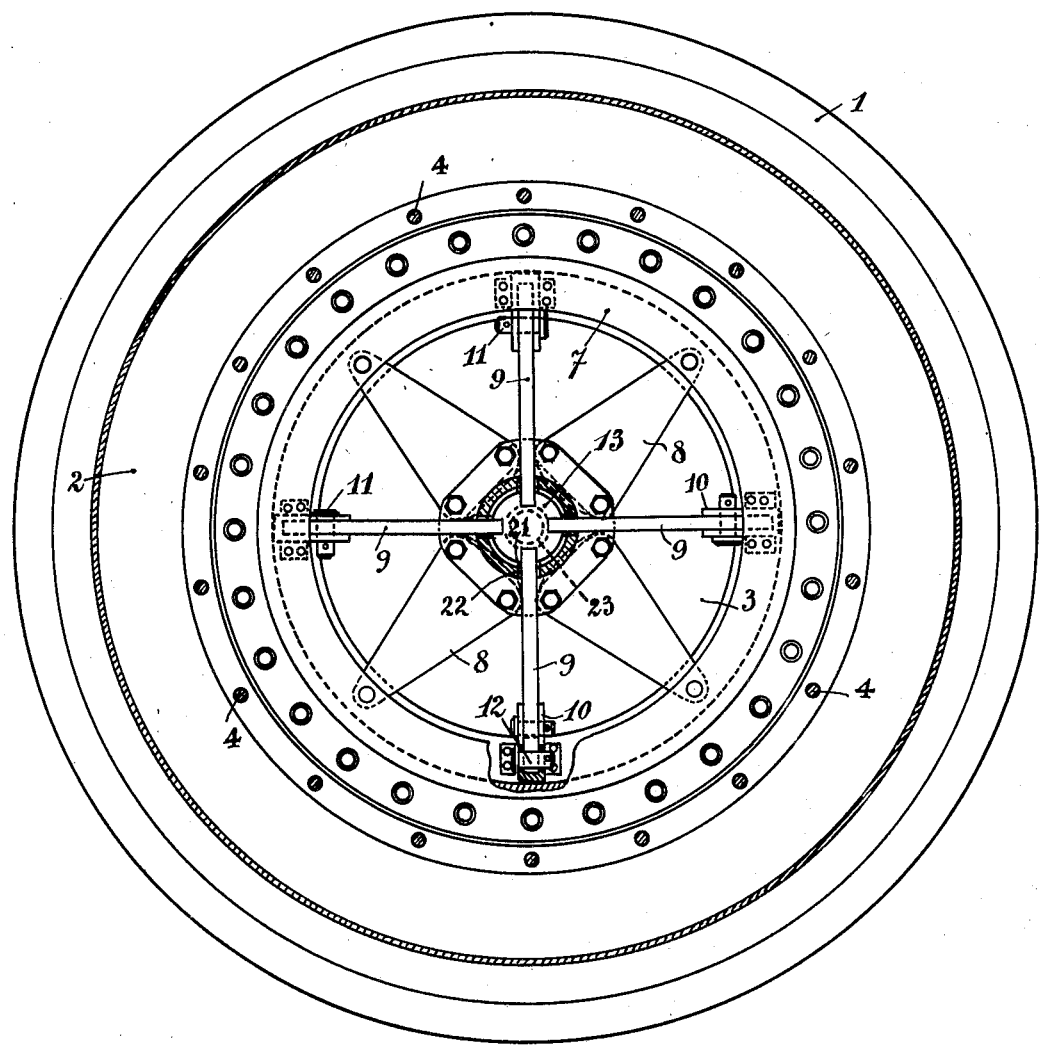

Referring to the accompanying drawings, in which one particular manner of carrying out the invention is illustrated by way of example, Figure 1 illustrates a section along the axle of an aeroplane wheel provided with a brake device according to the invention, Fig. 2 is an elevational view, partly in section on the line 2—2 of Fig. 1, the lateral discs of the wheel being supposed removed so as to show the brake shoes and the spring arms that support them.

The wheel proper consists of a rim 1 on which two discs 2, the central portions of which are removed, are riveted or welded at their points of contact with the said rim. Their inner edges are clamped by means of screw bolts 4 between two conical plates 3 of sheet material or cast iron which widen out at the axis and are rotatably mounted on ball bearings 5 on the fixed axis 6.

The brake parts are disposed in the space existing between the plates 3, so that they are protected from atmospheric influences.

The brake device consists of two circular brake shoes 7 which can be brought into braking contact with corresponding braking surface members on the plates 3 constituting the wheel proper by displacement in the direction of the wheel axle. The brake shoes 7 are solidly connected with the fixed axle by radial arms 8 comprising leaf springs which are so disposed as to normally maintain the brake rings out of the operative or braking position. The displacement of the brake rings 7 is obtained by means of a system of levers consisting of a radially disposed lever 9 pivotally connected at 12 to one brake ring 7 and onto which is pivoted at 11 one end of a link 10 pivoted at the other end at 12 onto the other brake ring 7.

In the example shown, there are four radial arms for connecting the brake shoes to the axle, and there are also four levers 9, each making an angle of 45° with the two adjacent radial arms 8. But this is only an arrangement shown by way of example, and any number of radial arms and levers may be chosen according to the size of the wheel.

As is easily evident from the figure the brake rings are moved away from one another by displacing the lever 9 towards the left, which causes them to abut against the braking surface of the wheel.

This displacement of the lever 9 is effected directly by a reciprocable head 13 sliding inside the wheel axle, and operated either by fluid pressure or by mechanical control.

In the case illustrated, the control is obtained by means of a gaseous or liquid medium The head 13 can slide within the fixed axle 6 and is kept in abutting relation with the inner end of lever 9, the latter passing through a slot 21 in said head and a slot 22 in the tubular axle 6. This construction prevents head 13 from rotating within the axle 6 but it will be realized that any other known device, such as a key, could be provided for that purpose, as additional means. Head 13 is solidly connected with a rod 23 screwed into a socket member 14, which is slidably mounted in axle 6, a removable key 16 normally preventing said socket 14 from turning within said axle 6. Small piston 17, fitted in cylinder 18, to which the fluid under pressure is fed through flexible pipe 19, serves to move socket 14 longitudinally in axle 6, thus controlling the displacements of lever 9 for applying the brake.

In order to permit the adjustment of the brake, and especially to take up the play resulting from wear of the brake linings, cross head 13 can be displaced within hollow axle 6 through the following arrangement:

As above explained, head 13 can slide within axle 6 but is not allowed to rotate with respect thereto. On the other hand axle 6 is provided with openings 24 through which a tool fitting into sockets 15 of member 14 can be inserted. Now, if key 16 is removed, member 14 may be rotated, through said tool, with respect to axle 6, without being given any longitudinal movement therein. As head 13 and member 14 are connected together through a rod or tube 23 rigidly fixed to head 13 and screwing into member 14, such a rotary displacement of member 14 within axle 6 will produce a longitudinal movement of head 13 which, as above explained, can slide, but not rotate within axle 6. This will permit to adjust the normal position of lever 9.

Of course, when key 16 is in position, member 14 cannot rotate within axle 6 and the only longitudinal displacements that head 13 can then be given are those due to the displacement of piston 17 in cylinder 18 under the action of a fluid under pressure fed through pipe 19.

The removable system consisting of the wheel and axle is secured to the under carriage struts (not shown), by means of the wing nut 20, which also serves for connecting with the axle the casing containing the pressure cylinder 18 with its actuating piston 17 and other accessory parts.

What I claim is:

1. In a braking device of the type described the combination of a hollow wheel axle, of brake shoes resiliently carried by said axle, of a linkwork connection with said brake shoes for the control thereof, of a head slidably mounted within said axle and operatively engaging said linkwork, of a socket adjustably connected with said head for controlling the same, and of means for moving the socket for braking purposes.

2. In a braking device of the type described, the combination of a hollow wheel axle, of brake shoes resiliently connected with said axle, of a linkwork connected with said brake shoes for the control thereof, of a head slidably mounted within said axle and operatively engaging said linkwork, the axle and the head being correspondingly slotted to be traversed by part of the linkwork in a way to prevent the rotation of said head, of a socket adjustably connected with said head for controlling the same and of means for moving the socket for braking purposes.

3. In a braking device of the type described, the combination of a hollow wheel axle, of brake shoes resiliently connected with said axle, of a linkwork connected with said shoes for the control thereof, of a head slidably mounted within said axle and operatively engaging said linkwork, of means for preventing the rotation of said head with reference to said axle, of a rod connected with said head and having a threaded portion, of a socket slidably mounted within said axle and having a threaded portion engaging the threaded portion of said rod, of means for rotating said socket within said axle for adjustment purposes, of removable means for preventing the rotation of said socket within said axle and of means for moving said socket for braking purposes.

4. In a braking device of the type described the combination of a hollow wheel axle, of brake shoes resiliently connected with said axle, of a linkwork connected with said brake shoes for the control thereof, of a head slidably mounted within said axle and operatively engaging said linkwork, of a socket adjustably connected with said head for controlling the same, of a pressure fluid cylinder associated with said axle adjacent said socket, of a piston mounted within said cylinder and adapted to operatively engage said socket, and of means for admitting pressure fluid into the said cylinder for the purpose set forth.

5. A braking device for a wheel, and especially for an airplane wheel, which comprises in combination, at least one friction disc carried by said wheel, a hollow wheel axle, brake shoes adapted to frictionally engage said disc, resilient means for directly connecting said brake shoes to said axle adapted to normally keep said brake shoes out of contact with said friction disc, articulated means for applying said brake shoes against said friction disc, a head, slidably mounted in said axle, for actuating said articulated means, a socket also slidable in said axle, adjustable means for connecting said socket to said head, and means for causing said socket to slide in said axle.

6. A braking device for a wheel, especially adapted for an airplane wheel, which comprises in combination, at least one friction disc carried by said wheel, a hollow wheel axle, brake shoes adapted to frictionally engage said disc, a plurality of spring arms interconnecting said brake shoes and said axle, adapted to normally keep said brake shoes out of contact with said friction disc, articulated means for applying said brake shoes against said friction disc, a head, slidably mounted in said axle, for actuating said articulated means, a socket, also slidably mounted in said axle, adjustable means for connecting said socket to said head, and means for causing said socket to slide in said axle.

LOUIS BREGUET.